(No Model.)

S. L. KELLY.
BAKING PAN.

No. 478,609.  Patented July 12, 1892.

Witnesses
L. S. Elliott
E. W. Johnson

Sophia L. Kelly
Inventor
By
Attorney

UNITED STATES PATENT OFFICE.

SOPHIA L. KELLY, OF CLARKSDALE, MISSOURI.

BAKING-PAN.

SPECIFICATION forming part of Letters Patent No. 478,609, dated July 12, 1892.

Application filed December 10, 1891. Serial No. 414,620. (No model.)

*To all whom it may concern:*

Be it known that I, SOPHIA L. KELLY, a citizen of the United States of America, residing at Clarksdale, in the county of De Kalb and State of Missouri, have invented certain new and useful Improvements in Baking-Pans; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in baking-pans.

The object of the invention is to provide a baking-pan which consists of a pan proper having a spout and handle and a top hinged thereto, said top also having a handle and a ventilator and means for securing the same to the pan or lower section, the pan-section carrying a grate or tray, as will be hereinafter fully set forth, and particularly pointed out in the claims.

Figure 1:
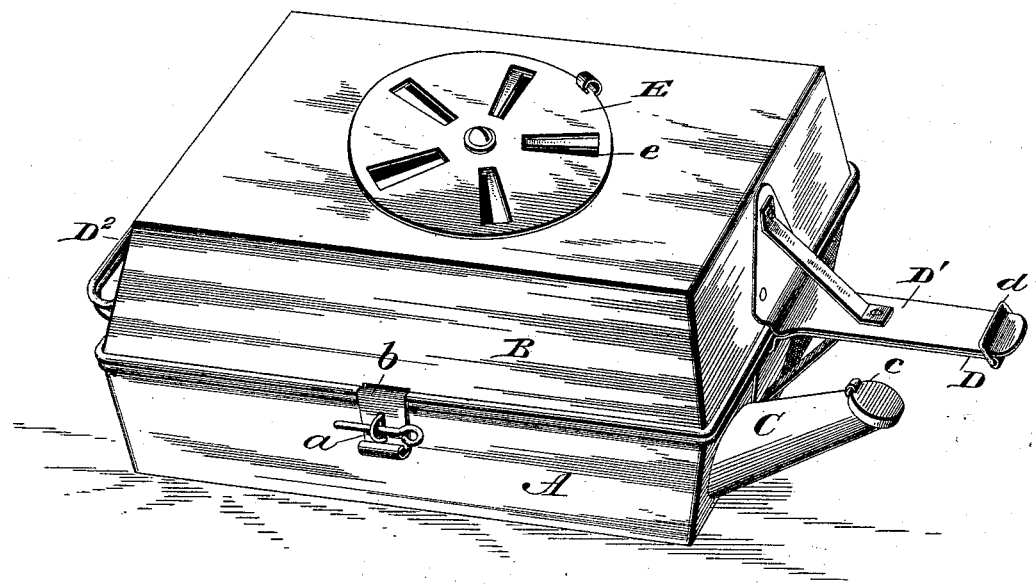
Figure 2:
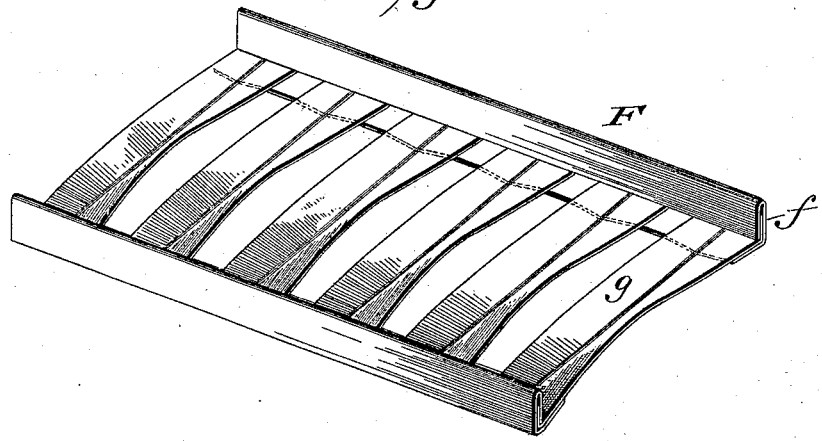

In the accompanying drawings, forming part of this specification, Figure 1 is a perspective view of a baking-pan constructed in accordance with my improvements. Fig. 2 is a detail perspective view of the tray removed.

A refers to the base or bottom section of the baking-pan, which is provided on one of its long sides with a staple or eye $a$ and on the opposite side with hinges of ordinary construction, which provide means for connecting the top B thereto. The bottom section is provided at one end with a spout C, which inclines upward, the end having a cap $c$ hinged thereto, and this end has also rigidly secured thereto a handle D, which carries at its end a bail $d$, adapted to engage with a similarly-constructed handle D', attached to the top and so positioned that when the sections are closed said handles will come together and may be locked by the bail. The opposite end of the pan and of the top are provided with the usual swinging handles D².

The cover or top B is of the same size as the pan and carries a slotted plate or hasp $b$, which is adapted to pass over the staple and be locked by a pin to secure the pans to each other, in addition to the handle-and-bail connection at the end thereof.

The upper portion of the top B is provided with a series of radiating apertures $e$, over which is secured a circular plate E having apertures which are adapted to register with the apertures $e$, these apertures, when registering providing means for allowing the heat to escape from the interior of the pan.

F refers to the grate or tray, which rests upon the bottom of the pan A, said tray being made up of longitudinal side pieces $f$, which are bent to provide parallel double vertical walls and a horizontal base at right angles therewith. Between the double walls and resting upon the base-pieces are secured cross-strips $g$, which are bent upwardly from the center longitudinally, the bend decreasing toward the ends, so that each cross-strip will form a trough in which the juices will collect and may be poured off by tilting the tray first sidewise and then endwise and out of the spout if the tray is in the pan.

I am aware that prior to my invention it has been proposed to provide a baking-pan composed of two sections, which are hinged to each other and provided with handles; also, that it has been proposed to provide the lower pan with a tray, and I do not claim such construction, broadly; but What I do claim as new, and desire to secure by Letters Patent, is—

1. A baking or roasting pan comprising a lower section A, having an upwardly-inclined spout secured adjacent to one corner thereof, said section having a looped handle at one end and a handle D at the opposite end, which projects beyond the spout, a section B, connected to the lower section and provided with similarly-constructed registering handles, the handles D D', having a loop for holding them in engagement with each other, and brace-bars which are connected to the handles and to the sides of the pan, substantially as shown, and for the purpose set forth.

2. A tray for baking-pans, consisting of side pieces bent substantially as shown and adapted to serve as a support and hold in engagement therewith cross-strips $g$, having upwardly-bent ends, said cross-strips being bent at their central portions longitudinally to form central troughs and flat outer ends, which form with the side pieces a channel when the tray is inclined, substantially as set forth.

In testimony whereof I affix my signature in presence of two witnesses.

SOPHIA L. KELLY.

Witnesses:
G. W. FARRINGTON,
W. J. F. THORNTON.